United States Patent [19]
Denning

[11] 3,761,042
[45] Sept. 25, 1973

[54] GAS TURBINE ENGINE

[75] Inventor: Ralph Murch Denning, Bristol, England

[73] Assignee: The Secretary of State for Defence in Her Britannic Majesty's Government of the United Kingdom of Great Britain and Northern Ireland, London, England

[22] Filed: May 4, 1971

[21] Appl. No.: 140,235

[30] Foreign Application Priority Data
May 16, 1970  Great Britain.................. 23,839/70
July 1, 1970   Great Britain.................. 31,937/70

[52] U.S. Cl............ 244/53 R, 60/226 R, 244/12 D, 244/23 D
[51] Int. Cl................................. B64b 1/36
[58] Field of Search .............. 244/53 R, 12, 42 CC, 244/23 D, 42 R; 60/226, 243, 239; 416/27

[56]         References Cited
          UNITED STATES PATENTS
2,873,576   2/1959   Lombard ........................ 60/239
3,008,515   11/1961  Wente........................... 60/243
3,054,254   9/1962   Hopper.......................... 60/243 X
3,108,767   10/1963  Eltis et al...................... 60/226 X
3,123,322   3/1964   Jackson et al................... 244/42 CC
3,191,886   6/1965   Lewis et al..................... 60/226 R
3,255,585   6/1966   Grieb........................... 244/12 D
3,472,321   10/1969  Ellinger........................ 60/226 R
3,503,572   3/1970   Hafner.......................... 244/42 R X
3,638,421   2/1972   Chilman......................... 60/226 R X
2,873,576   2/1959   Lombard ........................ 60/239
3,123,322   3/1964   Jackson et al................... 244/42 CC
3,255,585   6/1966   Grieb........................... 244/12 D
3,356,152   12/1967  Accorsi......................... 416/27
3,604,662   9/1971   Nelson et al.................... 244/53 R FOREIGN PATENTS OR APPLICATIONS
502,548    5/1954    Canada.......................... 416/27
881,662    11/1961   Great Britain................... 244/12

Primary Examiner—Milton Buchler
Assistant Examiner—Barry L. Kelmachter
Attorney—Stevens, Davis, Miller & Mosher

[57]              ABSTRACT

A gas turbine engine has a variable pitch fan and a first compressor mounted on one shaft and driven from a common turbine, together with a high pressure compressor and turbine on a second shaft, ducting to supply bleed air to high lift devices on an aircraft in which the engine is mounted, and means for bleeding air from the first compressor to the high lift devices when the fan blades are turned to fine pitch. A control system is included to maintain the first compressor speed at maximum when the high lift devices are being used.

7 Claims, 5 Drawing Figures

GAS TURBINE ENGINE

The present invention relates to gas turbine engines and relates in particular to gas turbine engines which are adapted to provide a bleed of air for use in operating high lift devices on an aircraft.

It has been proposed in our Patent Specification No. 1,127,853 to adapt a three-shaft engine for providing the required air bleed. In that specification we provide a fixed pitch front fan driven by a low pressure (LP) turbine and mounted on its own L.P. shaft. Part of the air compressed by the fan provides forward thrust through a forward propulsion nozzle while the remainder of the air passes into an intermediate pressure (IP) compressor driven by an I.P. turbine via an I.P. shaft. The flow through the I.P. compressor is split from a point about half-way along its length, part of the flow passing into the remaining stages of the I.P. compressor and hence to the high pressure (HP) compressor, while the remainder of the flow passes into a duct which directs it either to the high lift device or to an additional forward propulsion nozzle.

One disadvantage of an engine as described above is that when the aircraft is making its approach run the forward thrust required is minimum while the bleed to the high lift device is required to be a maximum, and these two conditions are incompatible in the above arrangement.

It is the object of the present invention to provide a gas turbine engine which overcomes this disadvantage.

According to the present invention, there is provided a gas turbine engine for use in an aircraft having a fluid operated high lift device, the engine comprising a first compressor and a second compressor in flow series, a fan drivingly connected to the first compressor and means for bleeding working fluid from the first compressor to the high lift device characterized in that the second compressor is driven from an H.P. turbine by means of a first shaft, the fan and the first compressor are driven from a common lower pressure turbine by means of a second shaft, the fan is a variable pitch fan, and control means are provided for controlling the speeds of the two shafts when the pitch of the fan is reduced.

The fan may be a front fan or an aft fan.

In one form of engine according to the invention the bleed to the fluid-operated high lift devices is used only when the aircraft is on its landing approach to an airfield. On take-off the fan blading is set to a pitch required for maximum fan thrust and all the air compressed by the first compressor passes into the second compressor.

In another form of engine, however, the first compressor is dimensioned to compress an amount of air which is surplus to that required for the second compressor and a permanent bleed is taken from downstream of the intermediate pressure compressor.

According to a feature of the present invention therefore, there is provided a gas turbine engine for use in an aircraft having one or more air operated high lift devices, the engine comprising a front fan, an I.P. compressor, and an H.P. compressor all in flow series, the I.P. compressor being adapted to compress an amount of air surplus to that required by the H.P. compressor, and ducting along which said surplus air may pass to the high lift device or devices, characterized in that the fan and the I.P. compressor are driven from a common L.P. turbine by means of a first shaft, the H.P. compressor is driven from an H.P. turbine by means of a second shaft, the fan is a variable pitch fan, and a governor is provided which limits the maximum speed of the first shaft when the pitch of the fan is reduced, by controlling the fuel supplied to the engine.

In a preferred embodiment of the invention the ducting along which said surplus air passes is formed with a secondary passage which terminates in a rearwardly pointing propulsion nozzle, and valve means are provided for selectively directing the air to the high lift device or devices, and the propulsion nozzle.

With engines constructed according to the present invention, in the particular case of the aircraft approaching an airfield, the forward thrust of the engine can be reduced, while the air supply to the high lift device or devices is maintained at a high level by turning the fan blades to a fine pitch setting.

The term variable pitch fan as used in this specification is to be taken to include a fan, the blades of which are rotatable about their longitudinal axes to vary their angle of attack.

The high lift devices in the preferred embodiments of the invention are the flaps in the aircraft wings over or through which said surplus air passes to produce additional lift on the wings.

The fan may be directly connected to the shaft of the first compressor or may be connected thereto through a gearbox.

One example of the invention will now be more particularly described with reference to the accompanying drawings in which.

Figure 1:
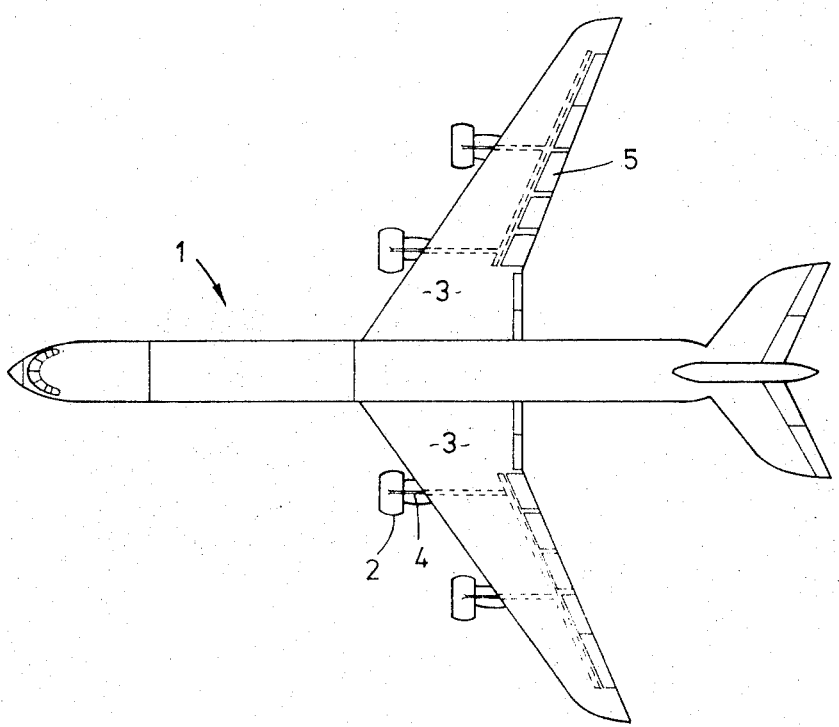
FIG. 1 illustrates an aircraft incorporating the present invention.

Referring now to the drawings FIG. 1 shows an aircraft 1 underneath the wings 3 of which, four engines 2 are mounted on pylons 4. Along each of the wings are flaps 5 for aircraft control and a duct 6 extends along the wing adjacent the flaps to carry compressed air which is ejected over the flaps from slit nozzles (not shown) along the rearward side of the duct. The air is supplied to the duct 6 from each engine via ducting 7 in the pylon.

Figure 2:
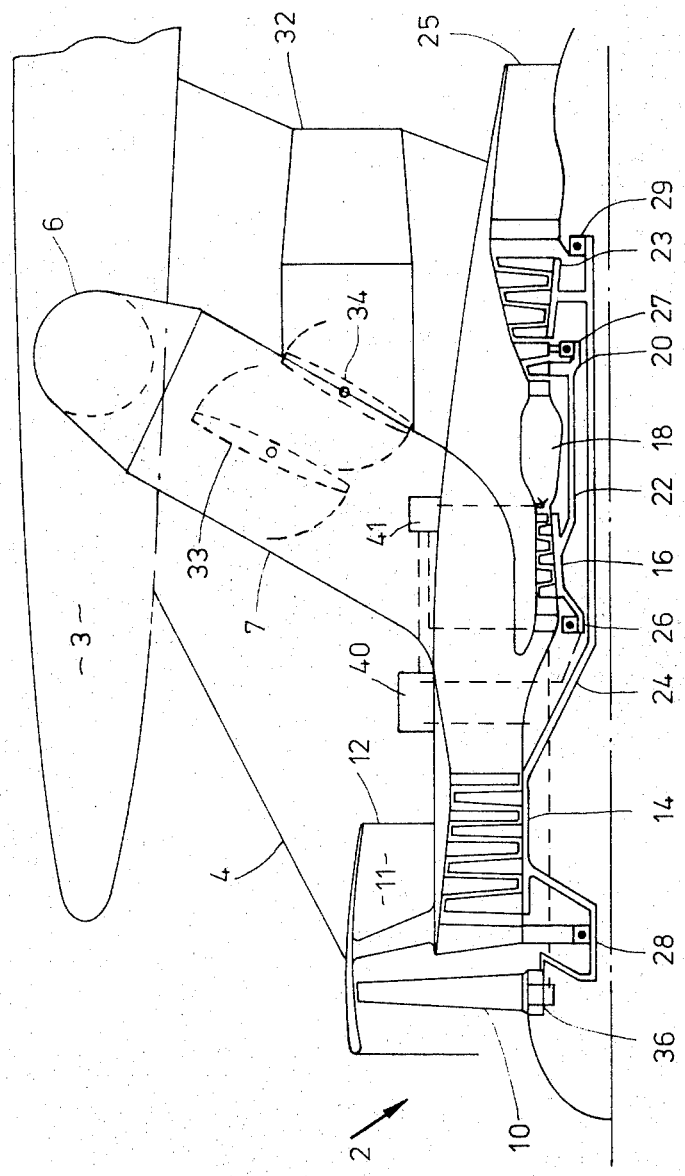
FIG. 2 is an enlarged view which illustrates diagrammatically the layout of one of the engines of the aircraft of FIG. 1.

Turning now to FIG. 2 one of the engines 2 is shown in a cut-away view which shows the top half only of the engine.

The engine comprises a front fan 10 mounted for rotation in a duct 11 which terminates downstream of the fan in a propulsion nozzle 12. Part of the air compressed by the fan passes rearwards, radially inwardly of the duct, into an I.P. compressor 14. The I.P. compressor is made large enough to compress an amount of air surplus to the requirements of an H.P. compressor 16 downstream thereof, so that only part of the air compressed by the I.P. compressor passes rearwardly into the H.P. compressor and hence to the combustion equipment 18.

The hot gases produced by the combustion equipment pass rearwardly into an H.P. turbine 20 which drives the H.P. compressor by means of an H.P. shaft 22, and then to an L.P. turbine 23 which drives both the I.P. compressor 14 and the fan 10 by means of an L.P. shaft 24. The hot gas efflux from the L.P. turbine finally passes to atmosphere through a hot gas propulsion nozzle 25.

The H.P. and L.P. shafts are supported for rotation in bearings represented at 26, 27, 28 and 29 respectively.

The surplus air compressed by the I.P. compressor passes into the ducting 7, in the pylon 4, which branches into two passages, one leading to the duct 6 in the wing for supplying the air to the aircraft flaps 5, and the other leading to a propulsion nozzle 32. Valves 33 and 34 are disposed in the ducting 7 for selectively closing one of the passages while opening the other.

Control of the valves is carried out directly by a pilot's lever in the aircraft cockpit.

The fan 10 is provided with a pitch varying mechanism 36 which can be of any suitable form, known per se, and is not described in detail. The mechanism 36 is under the control of a pilot's lever either directly or via the engine fuel system 41, e.g., the pilot may select H.P. shaft r.p.m. and the fuel system automatically controls the fan pitch from this.

The ratio of the thrust split between the fan propulsion nozzle, the bleed air, and the hot gas propulsion nozzle, may be of the order of 40 percent fan thrust, 40 percent bleed thrust and 20 percent hot gas thrust.

In operation such an engine would have a low hot jet velocity and would be relatively quiet. On take-off the pilot selects the coarse pitch setting for the fan; valve 33 to be open and valve 34 closed, thus providing 40 percent bleed thrust for the high lift devices to produce a short take-off. The air exhausting from the flaps gives some propulsive forward thrust, which is added to the thrust from the fan and hot gas nozzles.

Once in the air, the pilot changes over the selection of valves 33 and 34 so that valve 33 is closed and valve 34 open. This gives the normal crusing configuration and thrust is provided from nozzle 32.

On approach to an airfield the pilot again selects valve 33 to be open and valve 34 closed but now in addition the pilot also selects a finer pitch for the fan.

The effect of this is to take a significant load off the L.P. turbine and hence it tends to overspeed. The L.P. compressor which is also driven by the L.P. turbine also overspeeds, and an engine control governor (see FIG. 3), acts on the engine fuel system to reduce the engine speed to bring the L.P. turbine back to its governed speed. This in turn causes the engine governor to reduce the speed of the H.P. shaft and this consequently reduces hot gas thrust from the propulsion nozzle 25.

The effect is therefore, that the fan thrust and the hot gas thrust are both reduced by an amount depending on the degree by which the fan pitch is reduced, while the I.P. compressor continues to run at its maximum speed to provide air for flap blowing. There will, of course, be some loss of pressure from the I.P. compressor outlet, due to loss of thrust across the fan which supercharges the I.P. compressor. This will be compensated at least in part by the duct 7 receiving a greater portion of air from the I.P. compressor due to the H.P. compressor running more slowly.

A simple variable pressure loss producing mechanism, e.g., a butterfly valve, may be put into the duct to promote matching of the excess I.P. compressor flow to the flow required by the high lift device under these conditions.

Figure 3:
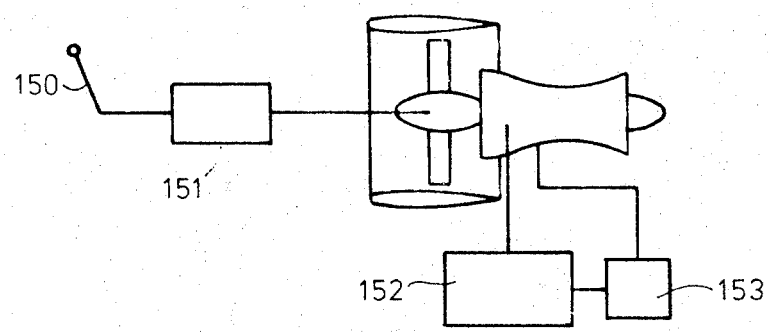
FIG. 3 illustrates diagrammatically a flow diagram for the control means which controls the speeds of the shaft.

FIG. 3 shows one example of a control system for the engine described above, and FIG. 4 illustrates the relationship between the shaft speeds at different thrust levels and pitch settings.

Figure 4:
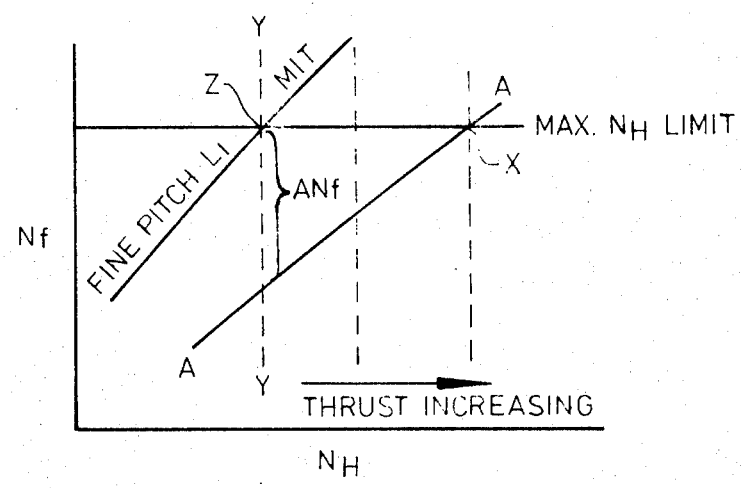
FIG. 4 is a graph showing generally the relationships between shaft speeds for various pitch settings and thrust levels.

Referring initially to FIG. 4 Fan speed $Nf$ is plotted vertically, and high pressure compressor shaft speed $NH$ is plotted horizontally. The limits of maximum fan speed and fine pitch are shown, and the vertical dotted lines indicate different total engine thrust levels, thrust increasing to the right, i.e., as NH increases. Line A A indicates a pitch setting required to give designed thrust at the designed maximum for speed, i.e., at the design point X with no lift augmentation.

Considering a fixed pitch fan engine, in order to reduce the thrust level required for landing approach, say YY, the engine operating parameters are constrained to move down the constant pitch line AA so that fan speed, and H.P. speed also decrease, and hence the bleed air available for the high lift devices also decreases. In an engine of the present invention however, in which the pitch is variable, the engine parameters can move along the constant maximum $Nf$ line until the thrust condition YY is reached, or until the fine pitch limit is reached after which the engine speed will have to decrease along the fine pitch limiting line.

The engine can be designed so that the fine pitch limit and the approach thrust value cross on the maximum fan speed line at point Z.

Hence it can be seen that with the present invention, an increase in fan speed, and hence I.P. compressor speed, of $\Delta Nf$, is achieved over a fixed pitch fan engine, and bleed air flow is maintained at the reduced thrust level.

Referring now to FIG. 3, one control system which achieves the desired conditions for various fan pitch settings, includes a connection from a pilot's lever 150 to a pitch change mechanism operating control 151. The control 151 actuates the pitch change mechanism of the engine. A fan speed governor 152 detects the change in fan speed and sends a signal to a fuel supply control unit 153 which in turn acts on the fuel system of the engine. The pitch change mechanism operating control 151 includes the fine pitch limiting stop, and the governor controls the fan maximum speed.

The fan is designed to run at maximum speed during normal cruising and take-off conditions, so that when the pitch of the fan is changed to fine pitch the fan tends to overspeed, and the governor maintains the maximum speed by reducing the fuel flow to the engine.

Similar effects can be obtained with a system operated by the pilot's lever sending a signal directly to an H.P. shaft speed governor, which acts on the fuel system to reduce engine speed. The speed reduction of the fan shaft can then be detected and a signal sent to the pitch change mechanism to vary the pitch to maintain the fan speed constant.

The system may be designed as an on-off system in which two pitch positions only of the fan are used for flap blowing or cruise conditions, or the system may be arranged to allow an infinite variation of fan pitch between the cruise position and the fine pitch limiting stop.

In an alternative form of engine the air bleed may only be used when the aircraft is on its approach run for landing on an airfield. In this case there is no need for the propulsion nozzle 32 and there will be no flap blowing on take-off.

This leads to a simpler engine design. The bleed may be up to 20 percent of the normal I.P. compressor mass flow, and the fan pitch is varied as required to keep the I.P. compressor operating near its design characteristic (i.e., to avoid compressor surge and fan blade flutter).

In this way the engine thrust can be reduced and added lift can be provided on the aircraft during approach, as described in relation to the engine shown in the figures, but for take-off the fan is turned to a coarse pitch to give maximum fan thrust while the whole of the air compressed by the I.P. compressor passes into the H.P. compressor to given maximum hot gas thrust. Some bleed air may be used on take-off to increase the aircraft lift, but it is believed that at take-off conditions the most efficient way of using the air available would be to have no bleed.

Figure 5:
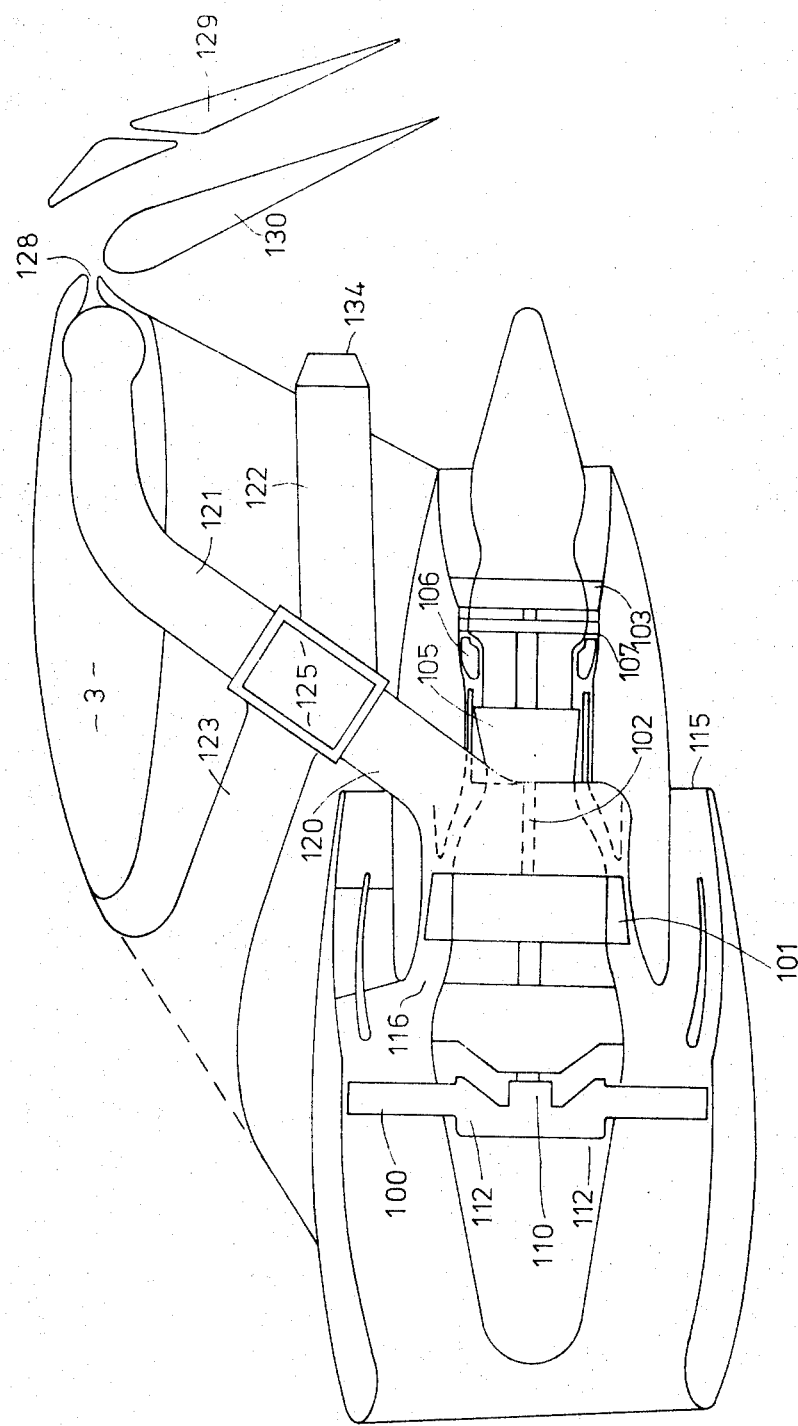
FIG. 5 illustrates an alternative engine layout which includes a reduction gear box.

Referring now to FIG. 5 there is shown a further alternative engine layout in which a fan 100 and an I.P. compressor 101 are mounted on an I.P. shaft 102 which is driven from a turbine 103. A gas generator comprising the usual H.P. compressor 105, combustion 105, combustion equipment 106 and H.P. turbine 107 provide the hot gases for driving the turbine 103.

The fan is connected to the I.P. compressor through a reduction gearbox 110, and is a variable pitch fan, the pitch changing mechanism being illustrated at 112.

Part of the air compressed by the fan passes out of a fan nozzle 115, while the remainder passes down an annular inlet passage 116 to the I.P. compressor 101.

The I.P. compressor is designed to compress an amount of air considerably greater than that required by the gas generator compressor 105, and the excess air is continuously fed to a bleed duct 120 which communicates with several ducts 121, 122 and 123 through a valve chamber 125.

The operation of this engine is very similar to the operation of the engine described with reference to FIG. 2 in that for take-off and approach valves in the chamber 125 are opened such as to allow the air from duct 120 to pass to the duct 121, from which it passes to the wing 3 of the aircraft. The air then passes through slit nozzle 128 in the trailing edge of the wing to pass between upper and lower flaps 129 and 130, to augment the lift of the wing.

During normal cruising flight the air is allowed to pass, by opening different valves in chamber 125 to a propulsion nozzle 134 at the end of duct 122, and after landing, a further valve may be used to allow the air to pass to duct 123 from which it issues forwardly to provide a thrust reversing effect.

The control for this engine may be similar to that described with reference to FIGS. 2, 3 and 4.

The engines of the present invention provide a range of power plants which offer a wide choice of operating conditions. Although the preferred split of thrusts between fan exhaust, bleed air, and hot gas exhaust is of the order of 40 percent fan exhaust, 40 percent bleed air and 20 percent hot gas exhaust a wide range of variations is possible.

For example in an aircraft where lift augmentation is required only on approach, the engine is designed without an oversize I.P. compressor and relies on up to 20 percent of the I.P. compressor air bled to the high lift device when the fan is turned to fine pitch, as described above.

Where large bleeds are required for aircraft wing lift augmenting devices, the oversize I.P. compressor can be used as described herein and the thrust split may be such that up to 60 percent of the engine thrust is produced by the bleed air.

The above examples have been described with particular reference to a front fan engine but it will be understood that the fan may be an aft fan, and the principle of operation would be the same.

In either case this fan may be connected directly to the shaft of the L.P. turbines, or may be connected through a reduction gearbox to reduce fan r.p.m. and hence fan noise.

I claim:
1. A gas turbine engine for use in an aircraft having a fluid operated high lift device, said engine comprising:
   a. a first compressor;
   b. a second compressor in flow series with said first compressor;
   c. a fan drivingly connected to said first compressor, said fan being a variable pitch fan;
   d. means for bleeding fluid from said first compressor to the high lift device;
   e. a low pressure turbine;
   f. a first shaft drivingly connecting said fan and said first compressor to said low pressure turbine;
   g. a higher pressure turbine;
   h. a second shaft drivingly connecting said second compressor to said higher pressure turbine; and
   i. control means for controlling the speeds of said first and second shafts when the pitch of said fan is varied.

2. A gas turbine engine according to claim 1 wherein said fan is a front fan.

3. A gas turbine engine according to claim 1 further including a reduction gear connected between said first compressor and said fan.

4. A gas turbine engine according to claim 1 further including a first auxiliarly nozzle; and wherein said first compressor is dimensioned to compress an amount of air which is in surplus of that required for said second compressor; and wherein said means for bleeding includes a valve means which is selectively operable for directing air to the high lift device or said first auxiliarly propulsion nozzle, and ducting for directing the surplus air to said valve means.

5. A gas turbine engine according to claim 1 further including a second auxiliary propulsion nozzle connected to said valve means, said first propulsion nozzle being rearwardly pointing for producing forward thrust and said second propulsion nozzle being forwardly pointing for producing reverse thrust.

6. A gas turbine engine according to claim 1 wherein said control means comprises means for detecting the variations in speed of said first shaft, a fuel supply control means, and means connecting said detecting means and said fuel supply control means for varying the fuel supply to the engine as the fan speed varies.

7. A gas turbine engine according to claim 6 wherein said control means additionally comprises a fine pitch limiting stop ; and said detecting means includes a governor which limits the maximum speed of said first shaft.

* * * * *